United States Patent
Ichikawa

(10) Patent No.: US 11,933,355 B2
(45) Date of Patent: Mar. 19, 2024

(54) BALL JOINT

(71) Applicant: SOMIC MANAGEMENT HOLDINGS INC., Tokyo (JP)

(72) Inventor: Hisashi Ichikawa, Hamamatsu (JP)

(73) Assignee: SOMIC MANAGEMENT HOLDINGS INC., Tokyo (JP)

( * ) Notice: Subject to any disclaimer, the term of this patent is extended or adjusted under 35 U.S.C. 154(b) by 0 days.

(21) Appl. No.: 17/772,000

(22) PCT Filed: Oct. 22, 2020

(86) PCT No.: PCT/JP2020/039767
§ 371 (c)(1),
(2) Date: Apr. 26, 2022

(87) PCT Pub. No.: WO2021/085306
PCT Pub. Date: May 6, 2021

(65) Prior Publication Data
US 2022/0403873 A1    Dec. 22, 2022

(30) Foreign Application Priority Data
Oct. 29, 2019    (JP) .................. 2019-196484

(51) Int. Cl.
*F16C 11/06* (2006.01)
(52) U.S. Cl.
CPC ........ *F16C 11/068* (2013.01); *F16C 11/0671* (2013.01); *F16C 11/0633* (2013.01)

(58) Field of Classification Search
CPC .............. F16C 11/0623; F16C 11/0633; F16C 11/0638; F16C 11/0666; F16C 11/0671; F16C 11/068; F16C 11/0685; F01M 9/12; F01M 11/00
See application file for complete search history.

(56) References Cited

U.S. PATENT DOCUMENTS 3,442,561 A * 5/1969 Henry-Biabaud ........................... F16C 11/0628
384/213
3,451,701 A * 6/1969 Smith ................. F16C 11/0638
403/140

(Continued)

FOREIGN PATENT DOCUMENTS

DE    739059 C  *  9/1943
DE    19647024 A1 *  5/1998  ............... B60S 1/24

(Continued)

OTHER PUBLICATIONS

Mayer, Ashley. "Mixing Lubricants: A Recipe for Trouble". Machinery Lubrication. Jul. 30, 2017, [online], [retreived on May 22, 2023]. Retreived from the Internet <URL:https://web.archive.org/web/20170730090006/http://www.machinerylubrication.com/Articles/Print/1135>.*

(Continued)

*Primary Examiner* — Josh Skroupa
*Assistant Examiner* — Kevin J Baynes
(74) *Attorney, Agent, or Firm* — TROUTMAN PEPPER HAMILTON SANDERS LLP

(57) ABSTRACT

A ball joint includes a first lubricant interposed between a ball part of a ball stud and a bearing sheet. The ball joint includes a second lubricant having a higher friction coefficient than the first lubricant and enclosed inside a dust cover.

2 Claims, 1 Drawing Sheet

(56) References Cited

U.S. PATENT DOCUMENTS

| | | | | |
|---|---|---|---|---|
| 3,460,650 | A | * | 8/1969 | Henry-Biabaud .......................... F16C 11/0628 277/635 |
| 3,476,417 | A | * | 11/1969 | Born ................. F16B 43/001 403/126 |
| 4,003,666 | A | * | 1/1977 | Gaines ................. F16C 11/068 403/140 |
| 4,003,667 | A | * | 1/1977 | Gaines ................. F16C 11/068 277/635 |
| 4,034,996 | A | * | 7/1977 | Manita ................. B60G 5/053 403/228 |
| 5,568,930 | A | * | 10/1996 | Urbach ................. F16J 3/046 277/637 |
| 6,742,955 | B2 | * | 6/2004 | Moses ................. F16C 11/068 403/135 |
| 6,866,441 | B2 | * | 3/2005 | Yokoyama ............ F16J 3/042 403/135 |
| 7,325,289 | B2 | * | 2/2008 | Budde ................. F16C 11/0633 409/122 |
| 7,537,407 | B2 | * | 5/2009 | Shima ................. F16C 11/0638 403/135 |
| 7,862,250 | B2 | * | 1/2011 | Kuru ................. F16C 11/0628 277/635 |
| 7,870,673 | B2 | * | 1/2011 | Michioka ............ F16C 11/0685 29/898.047 |
| 8,616,800 | B2 | * | 12/2013 | Abe ................. F16C 11/0685 403/139 |
| 9,302,560 | B2 | * | 4/2016 | Kim ........................ B60G 7/005 |
| 2002/0154941 | A1 | | 10/2002 | Bröker et al. |
| 2003/0077114 | A1 | | 4/2003 | Bröker et al. |
| 2003/0156896 | A1 | * | 8/2003 | Suzuki ................. F16J 3/042 403/134 |
| 2009/0279820 | A1 | * | 11/2009 | Nishide ................. F16C 23/043 29/898.15 |
| 2010/0086347 | A1 | | 4/2010 | Bernhardt |
| 2012/0020724 | A1 | | 1/2012 | Kurasako et al. |
| 2016/0265584 | A1 | * | 9/2016 | Ichikawa ............ F16C 11/0623 |
| 2016/0369837 | A1 | * | 12/2016 | Yu ........................ F16C 11/0633 |
| 2017/0023055 | A1 | * | 1/2017 | Lee ........................ F16C 11/0614 |
| 2020/0191194 | A1 | * | 6/2020 | Gruber ................. F16C 11/0685 |

FOREIGN PATENT DOCUMENTS

| | | | |
|---|---|---|---|
| EP | 1 096 161 A1 | 5/2001 | |
| JP | 2000230539 A | 8/2000 | |
| JP | 2002213430 A | * 7/2002 | ......... F16C 11/0604 |
| JP | 2003522910 A | 7/2003 | |
| JP | 2003522911 A | 7/2003 | |
| JP | 2018145996 A | 9/2018 | |
| WO | 2010137181 A1 | 12/2010 | |

OTHER PUBLICATIONS

Office Action issued in Japanese Patent Application No. 2019-196484 dated Oct. 12, 2022 (with machine translation).
International Search Report issued in International Application No. PCT/JP2020/039767 dated Dec. 15, 2020.
Extended European Search Report issued in European Patent Application No. 20882565.3 dated Oct. 30, 2023.

* cited by examiner

BALL JOINT

CROSS-REFERENCE TO RELATED APPLICATIONS

This application is a U.S. National Phase of International Patent Application No. PCT/JP2020/039767, filed on Oct. 22, 2020, which published as WO 2021/085306 A1 on May 6, 2021, and claims priority to JP 2019-196484, filed on Oct. 29, 2019, all of which are herein incorporated by reference in their entireties.

TECHNICAL FIELD

This invention relates to a ball joint including a lubricant interposed between a ball part of a ball-side member and a sheet member.

BACKGROUND ART

In a steering device or a suspension device of a vehicle such as an automobile, a ball joint as a joint device (bearing device) is conventionally used as a function of transmitting power from a steering for pointing a tire toward a traveling direction or a function of absorbing impact on the tire received from a road surface.

While it is desirable to always keep a certain degree of performance (characteristic) of the ball joint in order to maintain steering feeling property or traveling stability of the vehicle, various factors make it difficult to maintain the performance constantly.

An example of the performance reduction is reduction in sliding torque. The sliding torque is reduced mainly by a factor that, in response to repeated swinging motion or rotation of a ball part of a ball stud, a bearing sheet holding the ball part is degraded, worn or the like.

The sliding torque is affected by a factor that is a friction coefficient, specifically, friction between an outer peripheral surface of the ball part and a holding surface of the bearing sheet. Grease as a lubricant is used for controlling this friction coefficient (see PTL 1, for example).

CITATION LIST

Patent Literature

PTL 1: Japanese Laid-open Patent Publication No. 2018-145996 (pp. 5 to 7, FIG. 1)

SUMMARY OF INVENTION

Technical Problem

Grease has conventionally been used for maintaining lubricity. Grease being developed in recent years includes grease for responding to reduction in sliding torque, specifically, grease for suppressing reduction in the amount of sliding torque even on the occurrence of repeated swinging motion or rotation, as well as for improving initial traveling stability.

However, such a type of grease is generally expensive to result in cost increase. Additionally, while such a type of grease limits the extent of reduction in sliding torque compared to conventional ones, it still cannot stop the reduction itself.

Hence, avoiding cost increase while suppressing reduction in sliding torque has been desired. This problem also occurs in cases other than a ball joint for a vehicle.

This invention has been made in view of these points. It is an object of this invention to provide a ball joint capable of stabilizing sliding torque while suppressing cost increase.

Solution to Problem

A ball joint as recited in claim 1 includes: a receiving-side member including an inner chamber and an opening part communicating with the inner chamber; a sheet member housed in the inner chamber of the receiving-side member; a ball-side member including a ball part rotatably held by the sheet member, and a shaft part projecting from the opening part toward an outer side of the receiving-side member; a cover member attached to both the receiving-side member and the shaft part of the ball-side member while covering the opening part; a first lubricant interposed between the ball part of the ball-side member and the sheet member; and a second lubricant having a higher friction coefficient than the first lubricant and enclosed inside the cover member.

According to a ball joint as recited in claim 2, the ball joint as recited in claim 1 includes: an intake part through which the second lubricant is taken in between the sheet member and the ball part of the ball-side member.

Advantageous Effects of Invention

According to the ball joint as recited in claim 1, temporal reduction in sliding torque due to wear or degradation of the sheet member caused by the rotation of the ball part is canceled by intake of the second lubricant between the ball part and the sheet member resulting from this rotation of the ball part. This makes it possible to stabilize sliding torque while suppressing cost increase, in comparison to a case where the first lubricant that is generally available at comparatively high cost is used both between the ball part of the ball-side member and the sheet member and inside the cover member.

According to the ball joint as recited in claim 2, in addition to the effect achieved by the ball joint as recited in claim 1, it becomes possible to take in the second lubricant easily between the ball part of the ball-side member and the sheet member through the intake part. Furthermore, by designing the intake part in terms of shape, number, position, etc., it becomes possible to control the amount of intake of the second lubricant easily. As a result, temporal change in sliding torque can be controlled easily.

DESCRIPTION OF EMBODIMENTS

Figure 1:
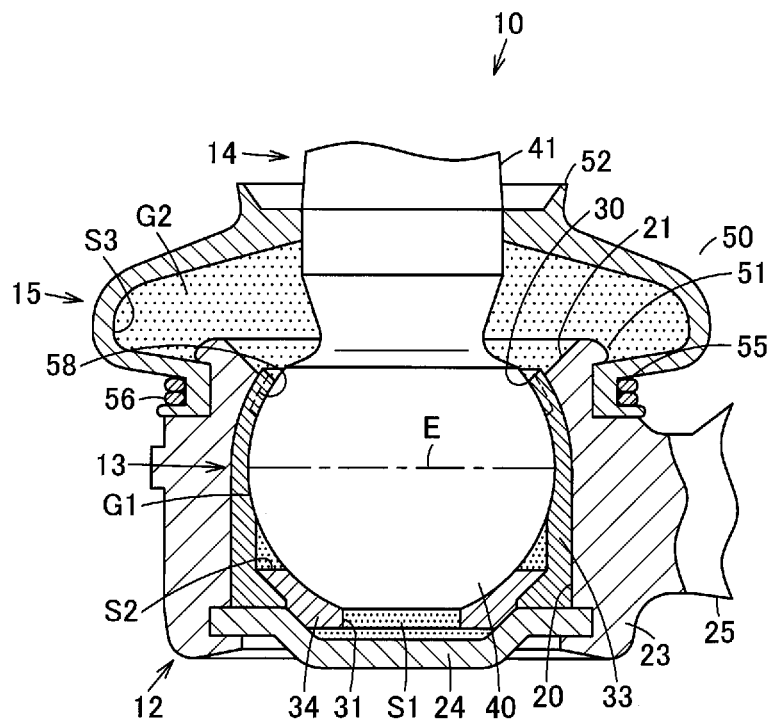
FIG. 1 is a sectional view showing a ball joint according to an embodiment of this invention.

An embodiment of this invention is described below by referring to the drawings.

Referring to FIG. 1, reference number 10 denotes a ball joint. In this embodiment, an outer ball joint (OBJ) provided to an end portion of a tie rod end of a steering device for automobile is described as an example of the ball joint 10. A vertical direction described in this embodiment below is based on a state shown in FIG. 1. However, the vertical direction is changed by a state of installation of the ball joint 10.

The ball joint 10 includes a housing 12 as a receiving-side member, a bearing sheet 13 as a sheet member, a ball stud 14 as a ball-side member, and a dust cover 15 as a cover member.

The housing 12 is also called a socket, for example, and is formed into a circular cylinder with a closed bottom. The housing 12 may be made of metal entirely. Alternatively, the housing 12 may be made of metal partially and the other part thereof may be made of resin, for example. The housing 12 has an axis extending along the vertical direction. In this embodiment, one-end side of the axis of the housing 12 is described as an upper side, and an opposite-end side of the axis thereof is described as a lower side. An inner chamber 20 housing the bearing sheet 13 is formed in the housing 12. An opening part 21 communicating with the inner chamber 20 is formed at an upper part of the housing 12. The inner chamber 20 is formed in such a manner as to be reduced in diameter gradually toward the opening part 21, namely, toward the upper part. The opening part 21 is formed in such a manner as to be increased in diameter gradually toward the opposite side of the inner chamber 20, namely, toward the upper part. This extends a range of swinging motion of the ball stud 14 to avoid interference with the ball stud 14 while the ball stud 14 makes swinging motion.

In this embodiment, the housing 12 includes a housing body part 23 as a circular cylindrical receiving-side member body part with the opening part 21 provided at its upper end portion, and a plug 24 as a closing part separated from the housing body part 23 and closing a lower end portion of the housing body part 23. However, the housing 12 is not limited to this but may be formed integrally into a circular cylinder with a closed bottom. In this embodiment, an arm part (link part) 25 of the tie rod end extending along an axis-perpendicular direction is formed outside the housing 12 (housing body part 23). However, the arm part 25 is not an essential part.

The bearing sheet 13 is also called a ball sheet, for example, and is formed into a circular cylinder. The bearing sheet 13 is made of synthetic resin with excellent wear resistance and a high elastic modulus, for example. The bearing sheet 13 is arranged coaxially or substantially coaxially with the housing 12. The bearing sheet 13 has an outer peripheral surface contacting an inner peripheral surface of the inner chamber 20. Thus, the bearing sheet 13 is held in the inner chamber 20 of the housing 12 in a state of being reduced in diameter gradually toward an upper part.

The bearing sheet 13 includes one sheet opening part 30 provided at least at an upper part thereof. The one sheet opening part 30 communicates with the opening part 21 of the housing 12. In this embodiment, the bearing sheet 13 includes an opposite sheet opening part 31 provided at a lower part thereof. The opposite sheet opening part 31 is located separately from the inner chamber 20 of the housing 12. A spatial part S1 is formed between the opposite sheet opening part 31 and the housing 12 (plug 24). The spatial part S1 covers a range from the bottom of the housing 12 (plug 24) to the opposite sheet opening part 31. An inner peripheral surface of the bearing sheet 13 is curved into a spherical surface and functions as a sliding contact surface with a ball part 40 of the ball stud 14 described later. If necessary, the inner peripheral surface of the bearing sheet 13 may be given a groove, a recess, a protrusion, etc.

In this embodiment, a what is called two-piece type sheet with a first member 33 and a second member 34 is described as an example of the bearing sheet 13. However, the bearing sheet 13 is not limited to this but it may be a one-piece type sheet formed integrally as a whole.

The first member 33 is a part formed into a circular cylinder with opened opposite end portions and mainly functioning for holding an upper side of the ball part 40 of the ball stud 14. In this embodiment, the first member 33 has an outer peripheral surface tightly contacting the inner peripheral surface of the inner chamber 20 of the housing 12. The first member 33 extends from an upper end portion to a lower end portion of the inner chamber 20 of the housing 12. The one sheet opening part 30 is formed at an upper end portion of the first member 33. A lower end portion of the first member 33 may be in contact with or separated from the bottom of the housing 12 (plug 24).

The second member 34 is a part formed into a circular cylinder with opened opposite end portions and mainly functioning for holding a lower side of the ball part 40 of the ball stud 14. The second member 34 is formed shorter in a length determined in a direction between the opposite ends than the first member 33. The second member 34 is arranged at least partially inside the first member 33. In this embodiment, an upper part of the second member 34 is arranged inside the first member 33 and a lower part thereof slightly projects downward from the first member 33. A spatial part S2 is formed at an upper part of the second member 34. The opposite sheet opening part 31 is formed at a lower end portion of the second member 34. The lower end portion of the second member 34 may be in contact with or separated from the bottom of the housing 12 (plug 24).

The ball stud 14 includes the spherical ball part 40 provided at one end portion thereof, and a stud part 41 as a shaft part like an axis coupled to an opposite end portion thereof relative to the ball part 40. The ball stud 14 is made of steel, for example. The positional relationship of the ball stud 14 is described on the basis of a state where the ball stud 14 does not swing or rotate relative to the housing 12 and the bearing sheet 13, which is namely a neutral position.

An outer peripheral surface of the ball part 40 is partially held by the bearing sheet 13 in such a manner to be capable of sliding or rotating. The ball part 40 of this embodiment is held by the bearing sheet 13 in a certain region of the outer peripheral surface thereof in an axis direction including at least an equator position E. The equator position E is a position on the outer peripheral surface of the ball part 40 where a diameter dimension is the largest as viewed in a section crossing or perpendicular to the axis direction corresponding to a direction between one end and an opposite end of the ball stud 14.

A first lubricant (grease) G1 for setting sliding torque of the ball part 40 is interposed between the outer peripheral surface of the ball part 40 and the inner peripheral surface of the bearing sheet 13. The first lubricant G1 may also be called sliding grease and is present between the outer peripheral surface of the ball part 40 and the inner peripheral surface of the bearing sheet 13 from an initial state of the ball joint 10. The first lubricant G1 is a lubricant having a relatively low friction coefficient and causing little temporal torque reduction. The first lubricant G1 may be applied in advance to the outer peripheral surface of the ball part 40 or to the inner peripheral surface of the bearing sheet 13 before assembling of the ball part 40, or may be injected after assembling of the ball part 40.

The stud part 41 is a part to be connected to an external connection target member and to receive load. The stud part 41 may be formed integrally with the ball part 40, or may be formed separately from the ball part 40 and then may be integrated with the ball part 40 by welding, for example.

The dust cover 15 is also called a dust seal or a boot, for example, and is attached to both the housing 12 and the stud part 41 of the ball stud 14 while covering the opening part 21 of the housing 12. The dust cover 15 covers the opening part 21 of the housing 12 irrespective of the swinging motion of the ball stud 14, and functions to prevent entry of water, dust, etc. into the housing 12 or into the bearing sheet 13. The dust cover 15 is made of synthetic resin and formed into a substantially circular cylinder, for example. The dust cover 15 has an oblate shape smaller in axis dimension than in diameter dimension. The dust cover 15 includes a circular cylindrical cover body part 50, a first fixed part 51 fixed to the housing 12, and a second fixed part 52 fixed to the ball stud 14 that are provided integrally.

The cover body part 50 is a part to absorb deformation of the dust cover 15 occurring during swinging motion of the stud part 41 of the ball stud 14. In this embodiment, the cover body part 50 is formed in such a manner as to bulge in a radial direction at an intermediate position between opposite end portions thereof.

The first fixed part 51 is a part that closes a gap between the dust cover 15 and an outer periphery of the housing 12. The first fixed part 51 is fitted to a cover attachment part 55 formed at the housing 12. The cover attachment part 55 is formed into a groove at a position on the outer periphery of the housing 12 adjacent to its upper end, namely, at a position on an outer periphery of the opening part 21. The first fixed part 51 is tightened from the outer periphery side with an annular clip 56 as a fixing member to be held by the cover attachment part 55. The dust cover 15 is not limited to this but it may be a press-fit type member to be press-fitted into and held by the cover attachment part 55 without using the clip 56.

The second fixed part 52 is a part that closes a gap between the dust cover 15 and an outer periphery of the stud part 41 of the ball stud 14. The second fixed part 52 is in pressure-contact with the outer periphery of the stud part 41 of the ball stud 14 at a position adjacent to a base end, namely, adjacent to the ball part 40. The second fixed part 52 is formed into a smaller radius diameter than the first fixed part 51.

A spatial part S3 is formed inside the dust cover 15 and between an upper end portion of the housing 12 and the stud part 41 of the ball stud 14. A second lubricant (grease) G2 is enclosed in the spatial part S3. In this embodiment, the second lubricant G2 is filled in the spatial part S3. The second lubricant G2 is a lubricant that may also be called enclosed grease, located in the spatial part S3 in an initial state, and to be taken in between the outer peripheral surface of the ball part 40 and the inner peripheral surface of the bearing sheet 13 with time in response to repeated swinging motion or rotation of the ball stud 14. The second lubricant G2 is a lubricant having a different friction coefficient from the first lubricant G1. In this embodiment, the second lubricant G2 is a lubricant having a relatively high friction coefficient and causing large temporal torque reduction relative to the first lubricant G1. The second lubricant G2 has a higher friction coefficient than the first lubricant G1. To take in the second lubricant G2 more easily between the outer peripheral surface of the ball part 40 and the inner peripheral surface of the bearing sheet 13, the bearing sheet 13 may be provided with an intake part 58. The intake part 58 is formed at an end portion of the bearing sheet 13 facing the spatial part S3. Preferably, the intake part 58 is formed at a position at the one sheet opening part 30. A groove or a gap, or a combination thereof is used as the intake part 58, for example.

The operation of the embodiment is described next.

In an initial state of use (before endurance) of the ball joint 10, only the first lubricant G1 having a relatively low friction coefficient exists between the outer peripheral surface of the ball part 40 and the inner peripheral surface of the bearing sheet 13.

As temporal change occurs to apply load on the stud part 41 to cause the ball stud 14 to make swinging motion or rotation repeatedly about the ball part 40, the inner peripheral surface of the bearing sheet 13 is degraded or worn to reduce sliding torque. In the meantime, the second lubricant G2 having a relatively high friction coefficient is taken in from the spatial part S3 between the outer peripheral surface of the ball part 40 and the inner peripheral surface of the bearing sheet 13 to be mixed with the first lubricant G1 gradually, thereby increasing the sliding torque. Specifically, a variation is canceled between this reduction in sliding torque caused by the wear or degradation of the inner peripheral surface of the bearing sheet 13 and this increase in sliding torque caused by the intake of the second lubricant G2, namely, the reduction and the increase cancel each other. As a result, the reduction in sliding torque is suppressed to maintain the sliding torque substantially constantly.

Figure 2:
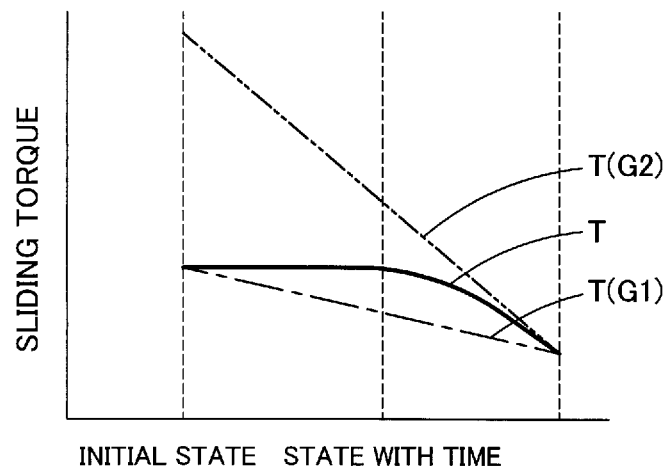
FIG. 2 is a graph schematically showing a relationship determined by each lubricant between time of use of the ball joint and sliding torque.

This action is schematically shown in FIG. 2. While sliding torque T (G1) determined by the first lubricant G1 is reduced gradually with time, this reduction is canceled by sliding torque T (G2) determined by the second lubricant G2. These types of torque are combined into sliding torque T and this torque is maintained substantially constantly for a long time.

When each of the sliding torque T (G1) determined by the first lubricant G1 and the sliding torque T (G2) determined by the second lubricant G2 is reduced to a certain amount or more, the sliding torque T is reduced gradually with time. In response to this, it gradually becomes difficult for the ball joint 10 to achieve the effect of this embodiment.

As described above, according to this embodiment, separately from the first lubricant G1 interposed between the ball part 40 of the ball stud 14 and the bearing sheet 13, the second lubricant G2 having a higher friction coefficient than the first lubricant G1 is enclosed inside the dust cover 15. By doing so, temporal reduction in sliding torque due to wear or degradation of the bearing sheet 13 caused by the rotation of the ball part 40 is canceled by intake of the second lubricant G2 between the ball part 40 and the bearing sheet 13 resulting from this rotation of the ball part 40. This makes it possible to stabilize sliding torque while suppressing cost increase, in comparison to a case where the first lubricant G1 that is generally available at comparatively high cost is used both between the ball part 40 of the ball stud 14 and the bearing sheet 13 and inside the dust cover 15.

By the provision of the intake part 58 for taking in the second lubricant G2 between the bearing sheet 13 and the ball part 40 of the ball stud 14, it becomes possible to take in the second lubricant G2 easily between the ball part 40 of the ball stud 14 and the bearing sheet 13 through the intake part 58. Furthermore, by designing the intake part 58 in terms of shape, number, position, etc., it becomes possible to control the amount of intake of the second lubricant G2 easily. As a result, temporal change in sliding torque can be controlled easily.

In particular, in the case of an outer ball joint provided to an end portion of a tie rod end of a steering device, impact is applied from a vehicle body to rotate the ball stud 14 largely. In this case, the second lubricant G2 can be taken in effectively between the ball part 40 and the bearing sheet 13.

In the aforementioned embodiment, the ball joint 10 may be of an inverted type in which the ball part 40 is arranged on an upper side and the stud part 41 is arranged on a lower side.

The ball joint 10 is not limited to that for an automobile or a vehicle but it is usable for any types of equipment.

INDUSTRIAL APPLICABILITY

This invention is preferably usable as a ball joint for a steering device or a suspension device for a vehicle such as an automobile, for example.

REFERENCE SIGNS LIST

10 Ball joint
12 Housing as receiving-side member
13 Bearing sheet as sheet member
14 Ball stud as ball-side member
15 Dust cover as cover member
20 Inner chamber
21 Opening part
40 Ball part
41 Stud part as shaft part
58 Intake part
G1 First lubricant
G2 Second lubricant

The invention claimed is:

1. A ball joint comprising:
a receiving-side member including an inner chamber and an opening part communicating with the inner chamber;
a sheet member housed in the inner chamber of the receiving-side member;
a ball-side member including a ball part rotatably held by the sheet member, and a shaft part projecting from the opening part toward an outer side of the receiving-side member;
a cover member attached to both the receiving-side member and the shaft part of the ball-side member while covering the opening part;
a first lubricant interposed between the ball part of the ball-side member and the sheet member and configured to provide a first friction coefficient between the ball part of the ball-side member and the sheet member; and
a second lubricant enclosed inside the cover member and configured to provide a second friction coefficient between the ball part of the ball-side member and the sheet member when mixed with the first lubricant; and
wherein the second friction coefficient is higher than the first friction coefficient.

2. The ball joint according to claim 1, comprising:
an intake part through which the second lubricant is taken in between the sheet member and the ball part of the ball-side member.

* * * * *